US012761464B2

(12) United States Patent
Notcutt et al.

(10) Patent No.: US 12,761,464 B2
(45) Date of Patent: Oct. 13, 2026

(54) GETTER VACUUM PUMP TO MAINTAIN VACUUM PRESSURE WITHIN A HOUSING OF A FABRY-PEROT CAVITY

(71) Applicant: STABLE LASER SYSTEMS, INC., Boulder, CO (US)

(72) Inventors: Mark Notcutt, Boulder, CO (US); Josue Davila-Rodriguez, Boulder, CO (US); William David Lee, Boulder, CO (US)

(73) Assignee: STABLE LASER SYSTEMS, INC., Boulder, CO (US)

( * ) Notice: Subject to any disclaimer, the term of this patent is extended or adjusted under 35 U.S.C. 154(b) by 224 days.

(21) Appl. No.: 18/493,550

(22) Filed: Oct. 24, 2023

(65) Prior Publication Data

US 2024/0142764 A1 May 2, 2024

Related U.S. Application Data

(60) Provisional application No. 63/381,453, filed on Oct. 28, 2022.

(51) Int. Cl.
*G02B 26/00* (2006.01)

(52) U.S. Cl.
CPC .................................. *G02B 26/001* (2013.01)

(58) Field of Classification Search
CPC .. G02B 7/008; G02B 26/00; G02B 26/26001; G02B 5/284; G02B 6/293; G02B 6/29358; G02B 6/29395; G02B 6/0095; H01S 3/05; H01S 3/13; H01S 3/139; H01S 3/036; H01S 3/0835; H01S 3/2383; H01S 3/1062; H01S 3/1305; H01S 3/1303; G02F 1/21; G02F 1/213
(Continued)

(56) References Cited

U.S. PATENT DOCUMENTS

| | | | |
|---|---|---|---|
| 5,324,172 | A | 6/1994 | Manini et al. |
| 7,560,820 | B2 | 7/2009 | Amiotti et al. |

(Continued)

OTHER PUBLICATIONS

Benvenuti et al. (1998) "Nonevaporable getter films for ultrahigh vacuum applications." Journal of Vacuum Science & Technology A: Vacuum, Surfaces, and Films 16, No. 1, 148-154.

(Continued)

*Primary Examiner* — Jie Lei
(74) *Attorney, Agent, or Firm* — Leydig, Voit & Mayer, Ltd.

(57) ABSTRACT

Methods and systems for controlling and maintaining the pressure in an ultra-stable optical resonance cavity are disclosed herein. A method for controlling and maintaining the pressure in an ultra-stable optical resonance cavity, for example, comprises providing an ultra-stable optical system housed in a vacuum housing enclosure and a pumping system in communication with the vacuum housing for maintaining a pressure in the vacuum housing less than $1\times10^{-6}$ Torr. The pumping system may comprise combination pumping achieved with the simultaneous use of a getter pump and an ion pump that provide passive and active pumping, respectively. The pumping system may also comprise passive pumping only with a getter vacuum pump only. The present invention, disclosed herein, achieves passive, power-free pumping in ultra-stable laser systems thereby enhancing the portability of such systems.

24 Claims, 7 Drawing Sheets

(58) Field of Classification Search
USPC ....... 359/578, 577, 584, 247, 346, 260, 261; 372/33, 59, 94
See application file for complete search history.

(56) References Cited

U.S. PATENT DOCUMENTS

| | | | |
|---|---|---|---|
| 8,399,299 | B2 | 3/2013 | Baillin |
| 9,957,154 | B2 | 5/2018 | Favier et al. |
| 10,141,712 | B1 | 11/2018 | Notcutt et al. |
| 10,427,395 | B2 | 10/2019 | Hogan et al. |
| 11,048,047 | B1 | 6/2021 | Erskine et al. |
| 11,821,801 | B1 | 11/2023 | Davila-Rodriguez et al. |
| 2004/0146073 | A1 | 7/2004 | Szarmes |
| 2013/0061655 | A1 | 3/2013 | Schober et al. |
| 2020/0161466 | A1 | 5/2020 | Yen et al. |
| 2023/0253753 | A1 | 8/2023 | Davila-Rodriguez et al. |
| 2023/0350130 | A1 | 11/2023 | Davila-Rodriguez et al. |

OTHER PUBLICATIONS

Benvenuti et al. (2001) “Vacuum properties of TiZrV nonevaporable getter films.” Vacuum 60, No. 1-2, 57-65.
BLACK (2001) “An introduction to Pound-Drever-Hall laser frequencystabilization.” Am J Phys. 69 (1): 79-87.
Boudot et al. (2020) “Enhanced observation time of magneto-optical traps using micro-machined non-evaporable getterpumps.” Scientific Reports 10, No. 1, 1-8.
Drever et al. (1983) “Laser phase andfrequency stabilization using an optical resonator.” Applied Physics B. 31 (2): 97-15 105.
International Search Report and Written Opinion, dated Mar. 13, 2024, corresponding to International Application No. PCT/US2023/077658, 10 pp.
Young et al. (1999) “Visible lasers with subhertz linewidths.” Physical ReviewLetters 82, No. 19, 3799.
Zhadnov et al. (Oct. 2021) “48-cm-long room-temperature cavities invertical and horizontal orientations for Sr optical clock.” Applied Optics 60, No. 29, 9151-9159.
Extended European Search Report dated Sep. 2, 2026 corresponding to European application No. 23883654.8.
Bu et al. (2012) “Preparation and sorption characteristics of Zr—Co—RE getter films”, Journal of Alloys and Compounds, 529:69-72 doi.org/10.1016/j.jallcom.2012.01.030.
Ferrario et al. (1995) “Chemical pumping in vacuum technology”, Vacuum 47(4):363-370 doi.org/10.1016/0042-207X(95)00252-9.
Hafner et al. (2020) A transportable interrogation laser system with an instability of mod $\sigma y=3\times10^{-16}$, Arxiv.Org Cornell University Library Ithaca, NY 14853.
Kersten et al. (1999) “A Transportable Optical Calcium Frequency Standard”, Applied Physics , B 68:27-38 doi.org/10.1007/s003400050582.
Millo et al. (2014) “Cryogenic single crystal silicon cavity”, 2014 European Frequency and Time Forum (EFTF) IEEE, pp. 531-534 doi.org/10.1109/EFTF2014.7331555.
Zhadnov et al. (2021) “Long 48-cm ULE cavities in vertical and horizontal orientations for Sr optical clock”, Arxiv.Org Cornell University 201 Olin Library Cornell University Ithaca, NY 14853.

GETTER VACUUM PUMP TO MAINTAIN VACUUM PRESSURE WITHIN A HOUSING OF A FABRY-PEROT CAVITY

CROSS-REFERENCE TO RELATED APPLICATIONS

This application claims the benefit of priority to U.S. Provisional Patent Application No. 63/381,453, filed Oct. 28, 2022, which is hereby incorporated by reference in its entirety.

STATEMENT REGARDING FEDERALLY SPONSORED RESEARCH OR DEVELOPMENT

This invention was made with government support under Award Number FA864921P0953 awarded by the United States Air Force Small Business Technology Transfer Program. The government has certain rights in the invention.

BACKGROUND OF INVENTION

Lasers that provide ultra-high frequency stability are necessary for various applications, including optical atomic clocks, precision spectroscopy, optical frequency comb stabilization, time transfer, and other high precision laser applications. To generate ultra-high frequency stability, the laser is locked to an ultra-stable reference cavity that may improve stability and linewidth characteristics. For example, the laser may be locked to the length of ultra-stable Fabry-Perot reference cavities, including so-called vacuum-gap cavities, which may achieve $1\times10^{-15}$ or better fractional length stabilities, wherein the fractional frequency stability of the laser locked to the reference cavity is a function of the fractional length stability of the reference cavity.

Proper mounting and temperature control of the reference ultra-stable cavity, such as a Fabry-Perot cavity, are important to maintaining cavity stability and enhancing frequency stability. In addition, to transfer the stability provided by the reference Fabry-Perot cavity to a laser, the cavity enclosure may be operated under a vacuum to remove air, thus minimizing additional instability from refractive index fluctuations due to pressure fluctuations. To achieve low pressure fluctuations, pressures maintained substantially below $1\times10^{-6}$ Torr are desirable. For example, if the laser fractional frequency stability is to be at $\sigma$ level on a given time-scale, pressure fluctuations must remain substantially below $\sigma/3.6\times10^{-7}$ Torr for some embodiments. For example, for a $1\times10^{-15}$ fractional frequency stability at 1 s, the pressure fluctuations must be substantially equal to or below $3\times10^{-9}$ Torr in 1 s for some embodiments. This is readily achievable if the average pressure is at $1\times10^{-6}$ Torr or below. Lower average pressures may be preferred to further reduce pressure fluctuations.

Ion pumps, which are substantially vibration free, are vacuum pumps used to achieve and maintain the necessary pressure in the vacuum chamber of an ultra-stable reference cavity. However, the use of ion pumps limits the portability and operation environments of ultra-stable laser systems because ion pumps require a continuous power source.

Substantially continuous pumping is required to maintain consistent pressure within a vacuum chamber housing a Fabry-Perot cavity, or other ultra-stable optical cavity, due to continuous outgassing of the materials within the vacuum chamber and, to a lesser extent, any residual leakage from sealing gaskets and other components. The rate of outgassing may be dependent on the materials and the materials' surface preparations used in a vacuum housing. Additionally, outgassing depends on the extent to which volatile compounds are reduced during a vacuum bake process. Construction techniques and materials with lower outgassing may be employed to reduce the pumping required to offset outgassing, however, various necessary components and design compromises may lead to outgassing rates that require continuous pumping. Ion pumps require a direct power source for pumping and can only begin operating at relatively low pressures (e.g., less than $1\times10^{-5}$ Torr). Depending upon the material of the vacuum chamber and the amount of leaking, upon temporary stoppage of the ion pump, even for short periods, for example, minutes to tens of minutes, the pressure may have risen such that the ion pump may not restart without supplemental pumping. In a laboratory, a remedy for this problem is the incorporation of supplemental pumps, such as a turbo-molecular station, to reduce the vacuum pressure to the pressure at which the ion pump may be restarted. If the vacuum housing is part of a deployed assembly, for example, the supplemental pump option may not be available. The continuous pumping and requirement of a power source presents practical constraints for the portability of ultra-stable laser systems by limiting, for example, the ability to ship the systems after fabrication or their use in more resource restricted and remote settings. In addition, the lifetime of an ion pump that is operated at higher pressures is limited, further constraining the requirements of ultra-stable laser systems.

SUMMARY OF THE INVENTION

Systems and methods are provided that employ a getter pump, for example, a non-evaporable getter (NEG) pump or an evaporable getter pump, alone or in combination with an ion pump for achieving and maintaining substantially stable vacuum pressures in a vacuum housing. Getter pumps establish and maintain vacuum pressure through interactions with gaseous species existing in a vacuum housing, for example, chemical adsorption, physical adsorption and/or accommodation of the gases remaining in a partial vacuum. Therefore, getter pumps do not require power to maintain a vacuum pressure of less than $1\times10^{-6}$ Torr within a vacuum chamber housing an ultra-stable optical cavity, for example a Fabry-Perot cavity. The addition of a getter pump to the pumping system used for establishing and maintaining stable vacuum pressures in ultra-stable laser systems provides significant improvements in the portability of ultra-stable laser systems. In some embodiments, integration of a getter pump allows for maintaining pressure during the shipment of a Fabry-Perot cavity assembly or during deployment in restricted resource and remote environments without consistent power access, e.g., remote sensing, aerospace deployment, etc. In addition, getter pumping provides assemblies that are mechanically stable (e.g., non-vibration producing) and are tolerant to power dropouts. The incorporation of a getter pump can significantly increase the lifetime of the accompanying ion pump due to the reduced load on the ion pump over time. The present methods and systems provide significant improvements in the portability of ultra-stable laser systems that can expand the settings in which high precision laser applications may be used, including remote uses such as in low earth orbit environments.

Provided herein are methods and systems for controlling and maintaining the pressure in an ultra-stable optical resonance cavity by enclosing the ultra-stable optical resonance cavity in a vacuum housing. The methods and systems disclosed herein may include controlling and maintaining a pressure of less than $1.0\times10^{-6}$ Torr, optionally less than $1.0\times10^{-7}$ Torr, in an ultra-stable optical resonance cavity contained in a vacuum housing. The methods and systems disclosed herein use a getter pump, for example, a non-evaporable getter (NEG) pump or an evaporable getter pump, in operational communication (e.g., fluid communication) with the vacuum housing to maintain a substantially stable pressure in an ultra-stable optical resonance cavity. In addition, disclosed herein are methods for transporting an ultra-stable optical resonance cavity in a vacuum housing with a pressure maintained at or less than $1.0\times10^{-6}$ Torr, optionally less than $1.0\times10^{-7}$ Torr, using a getter pumping system. The methods and systems disclosed herein may include a pumping system consisting of only a getter pump or a combination getter pump and an ion pump.

The methods and systems disclosed herein for controlling and maintaining the pressure in an ultra-stable optical resonance cavity provide significant improvements in the portability of ultra-stable laser systems. For example, unlike ion pumps, getter pumps do not require a power source. Therefore, for example, the pressure in an ultra-stable optical resonance cavity may be controlled and maintained during transport of an ultra-stable laser system without continuous access to a reliable power source. Improving ease of transport of ultra-stable laser systems is important to enable their use at destinations other than a highly equipped laboratory as well as for shipping these systems. In addition, the lifetime of ion pumps that may be used in conjunction with a getter pump to control and maintain the vacuum pressure in an ultra-stable optical resonance cavity may be significantly extended since the ion pump may be switched off for significant time periods, potentially even indefinitely. The ion pump may be turned off and, therefore, the lifetime of the ion pump may be increased, due to the fully passive pumping that may be achieved with a getter pump. Additionally, for example, if the ion pump is turned off, the pressure may be maintained such that the ion pump is capable of restarting without the need to attach a supplemental pump, for example, a turbo-molecular pump, to achieve vacuum pressures at which an ion pump is able to restart.

In an embodiment, provided herein is an optical system comprising: a first reflector; a second reflector in optical communication with the first reflector; a spacer provided between the first reflector and the second reflector to provide an optical path length between the first reflector and second reflector; wherein the first reflector and the second reflector are configured in substantially parallel planes with respect to one another, thereby forming an optical resonance cavity between the first reflector and the second reflector; a vacuum housing enclosing the optical resonance cavity; and a pumping system in communication (e.g., fluid communication) with the vacuum housing for maintaining a pressure in the vacuum housing less than $1\times10^{-6}$ Torr, optionally less than $1.0\times10^{-7}$ Torr; and the pumping system comprising a getter pump.

In an embodiment, provided herein are methods of controlling pressure in an ultra-stable optical resonance cavity, the method comprising: providing the ultra-stable cavity enclosed in a vacuum housing; wherein the ultra-stable cavity comprises: a first reflector; a second reflector in optical communication with the first reflector; a spacer provided between the first reflector and the second reflector to provide an optical path length between the first reflector and second reflector; wherein the first reflector and the second reflector are configured in substantially parallel planes with respect to one another, thereby forming the ultra-stable optical resonance cavity between the first reflector and the second reflector; and maintaining a pressure in the vacuum housing less than $1\times10^{-6}$ Torr, optionally less than $1.0\times10^{-7}$ Torr, using a pumping system in communication (e.g., fluid communication) with the vacuum housing; wherein the pumping system comprises a getter pump.

In an embodiment, provided herein are methods of transporting an ultra-stable optical resonance cavity, the method comprising: providing the ultra-stable cavity enclosed in a vacuum housing; wherein the ultra-stable cavity comprises: a first reflector, a second reflector in optical communication with the first reflector; a spacer provided between the first reflector and the second reflector to provide an optical path length between the first reflector and second reflector; wherein the first reflector and the second reflector are configured in substantially parallel planes with respect to one another, thereby forming the ultra-stable optical resonance cavity between the first reflector and the second reflector; and pumping said vacuum enclosure during transport using a pumping system in fluid communication with the vacuum housing so as to maintain a pressure in the vacuum housing less than $1\times10^{-6}$ Torr, optionally less than $1.0\times10^{-7}$ Torr; wherein the pumping system comprises a getter pump.

The methods and systems are compatible with a variety of getter pumps and systems. In some embodiments, the getter pump is optionally a non-evaporable getter (NEG) pump. In some embodiments, the getter pump is optionally an evaporable getter pump.

These methods and systems are compatible with a variety of optical resonance cavities. In some embodiments, the optical resonance cavity is optionally an ultra-stable cavity, for example a Fabry-Perot cavity, a so-called vacuum gap cavity. In some embodiments, for example, the optical resonance cavity is a space-vented cavity in low-earth orbit.

In some embodiments, the pumping system further comprises an ion pump in addition to the getter pumps. In some embodiments, the pumping system does not comprise any other pumps other than the getter pumps. In some embodiments, the getter pump comprises a non-evaporable getter (NEG) pump that is provided within the vacuum housing. In some embodiments, the NEG pump may optionally be provided as a coating on a portion of an internal surface of the vacuum housing exposed to the optical resonance cavity. In some embodiments, the NEG pump comprises one or more porous metals, alloys, metal oxides, or any combination of these. In some embodiments, the NEG pump comprises Al, Zr, Ti, V, Fe, or any combination of these. In addition, in some embodiments, the getter pump may comprise an evaporable getter pump that is provided within the vacuum housing. In some embodiments, the evaporable getter pump comprises one or more porous metals, alloys, metal oxides, or any combination of these. In some embodiments, the evaporable getter pump comprises $Ba(N_3)_2$, Ta, Nb, Zr, Th, Ti, Al, Mg, Ba, or P, or any combination of these.

In some embodiments, the present methods and systems may operate under a variety of pumping specifications that maintain a substantially constant pressure of the optical resonance cavity. In some embodiments, the substantially constant pressure of the optical resonance cavity is characterized by variations of less than $3\times10^{-9}$ Torr in 1 s, optionally less than $1\times10^{-9}$ Torr in 1 s. In some embodiments, the getter pump is characterized by a pumping speed selected over the range of 1 l/s to 500 l/s. In some embodiments, the getter pump is characterized by a sorption capacity selected over the range of 0.005 Torr·l to 1000 Torr·l.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING TERMINOLOGY AND NOMENCLATURE

Figure 1A:
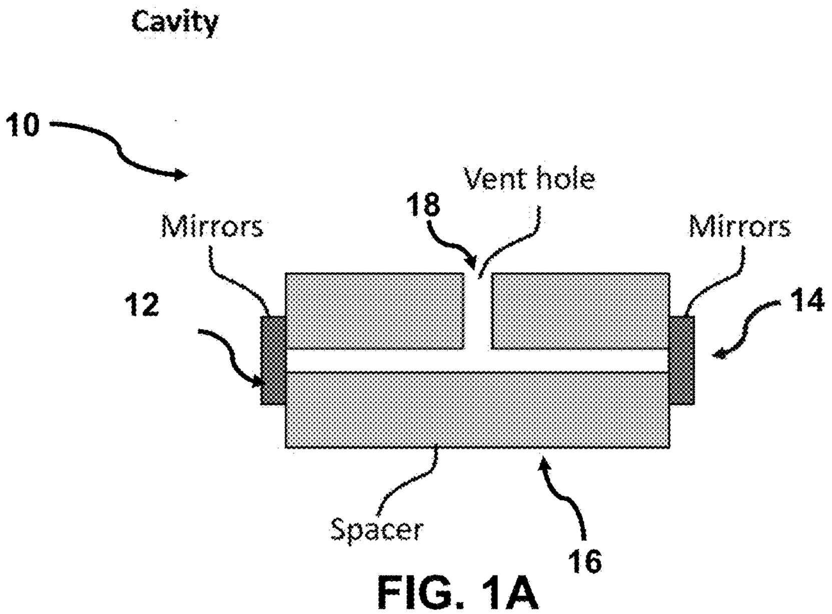
FIG. 1A: Diagram of an exemplary ultra-stable optical resonance cavity according to certain embodiments having a first mirror and a second mirror positioned in substantially parallel planes with respect to one another and a spacer between the first mirror and second mirror which defines the optical path length.

In general, the terms and phrases used herein have their art-recognized meaning, which can be found by reference to standard texts, journal references and contexts known to those skilled in the art. The following definitions are provided to clarify their specific use in the context of the invention.

As used herein, the terms "optical cavity" or "optical resonance cavity" are used interchangeably and refer to an arrangement of optical components, for example, two reflectors separated by a spacer that are provided substantially parallel to one another. Upon interaction with an incident beam, such as a coherent beam from a laser source, the optical cavity forms a standing light wave resonator whereby light waves that are confined within the optical cavity undergo reflections between the two mirrors thereby circulating over the length of the cavity. The spectral response of the cavity is based on optical interference. Due to the effects of interference, only certain frequencies are sustained in the cavity while other frequencies are suppressed. Optical cavities include systems that are maintained at a low pressure, for example, by incorporation of a vacuum housing, such a pressure less than $1\times10^{-6}$ Torr, optionally less than $1.0\times10^{-7}$ Torr. Optical cavities may be used as a reference for feedback control to stabilize a laser locked to the optical cavity. The optical cavity used to stabilize a laser locked to its length may comprise a linear Fabry-Perot cavity wherein the optical components comprise two opposing flat mirrors substantially parallel to one another and separated by a spacer that defines the cavity length. Optical cavities useful for certain embodiments are Fabry-Perot cavities, such as ultra-stable Fabry-Perot cavities and vacuum gap Fabry-Perot cavities. Example optical cavities include cavities for stabilizing optical sources such as a laser source, for example, using feedback control. The following references provide example specifications, components, and operation parameters of ultra-stable FP optical cavities: (i) Dreyer, R. W. P.; Hall, J. L.; Kowalski, F. V.; Hough, J.; Ford, G. M.; Munley, A. J.; Ward, H. (June 1983). "Laser phase and frequency stabilization using an optical resonator" (PDF). Applied Physics B. 31 (2): 97-105; (ii) Black, Eric D. (2001). "An introduction to Pound-Drever-Hall laser frequency stabilization" (PDF). Am J Phys. 69 (1): 79-87 and (iii) Young, B. C., F. C. Cruz, W. M. Itano, and J. C. Bergquist. "Visible lasers with subhertz linewidths." Physical Review Letters 82, no. 19 (1999): 3799.

As used herein, "getter pump" refers to a class of vacuum pumps that operate by the sorption, accommodation, reaction, diffusion and or retention of gaseous molecules by the getter material. Getter pumps include both non-evaporable getter pumps and evaporable getter pumps. For example, binding of gases to the surface of the getter pump and diffusion of gases into the getter pump may occur via either chemical adsorption (chemisorption), physical adsorption (physisorption) or other mechanisms involving accommodation, diffusion and/or reaction. Chemical adsorption comprises the binding of gases to the getter material through chemical forces involving the transfer of electrons to form bonds of varying character and strength. Chemisorption may occur, for example, via the formation of hydrogen bonds, covalent bonds, or metallic bonds between active gasses and the getter material. Physical adsorption occurs, for example, via electrostatic interactions between the getter material and gases comprising, for example, dispersion or polar forces.

Because getter pumps operate via sorption, accommodation, reaction, diffusion and/or retention of gaseous molecules, they may be characterized as providing a source of passive pumping. The getter material and size affects the pumping characteristics, for example, the sorption capacity and the pumping speed with which the getter may pump a gas existing in a vacuum chamber. In an embodiment, the pumping speeds of the getter materials used herein are characterized by a range selected from 1 l/s to 500 l/s. The sorption capacity of the getter materials used herein are characterized by a range selected from 0.005 Torr·l to 1,000 Torr·l.

A getter pump may be provided as a coating on a portion of an internal surface of a vacuum housing or another component in fluid communication with the vacuum housing. The getter pump coating of may be applied via deposition, sputtering or casting. Getter pumps of the invention may be temperature controlled, for example, via incorporation of thermocouples, heating elements, etc. in thermal communication with the getter pump.

As used herein, "non-evaporable getter (NEG) pump" refers to a class of vacuum pumps that operate by the sorption, accommodation and/or diffusion into the getter material of gaseous molecules including, but not limited to, $N_2$, $H_2O$, $CO_2$, CO, and hydrocarbons existing in a vacuum housing. The surface of the NEG may be clean or otherwise activated to enhance removal of gaseous molecules existing within a vacuum housing. To generate a clean surface, for example, the getter may be heated to high temperatures, referred to as activation temperature, to oxidize both the surface and the getter bulk. Reference made herein to a non-evaporable getter (NEG) pump is intended to include an NEG pump consisting of any adsorbent getter material. For example, the getter material may comprise Al, Zr, Ti, V, Fe, an alloy of any combination of these, a corresponding metal oxide, or any combination thereof. The getter material may comprise a porous material. The following references provide example specifications, components, and operation parameters of non-evaporable getters and evaporable getters: (i) Benvenuti, C., P. Chiggiato, F. Cicoira, and Y. L'Aminot. "Nonevaporable getter films for ultrahigh vacuum applications." Journal of Vacuum Science & Technology A: Vacuum, Surfaces, and Films 16, no. 1 (1998): 148-154 and (ii) Benvenuti, Cristoforo, P. Chiggiato, P. Costa Pinto, A. Escudeiro Santana, T. Hedley, A. Mongelluzzo, V. Ruzinov, and I. Wevers. "Vacuum properties of TiZrV non-evaporable getter films." Vacuum 60, no. 1-2 (2001): 57-65.

Reference made herein to an evaporable getter pump is intended to include any evaporable getter pump consisting of a getter material, or an adsorbent material. For example, the getter material may comprise $Ba(N_3)_2$, Ta, Nb, Zr, Th, Ti, Al, Mg, Ba, or P, an alloy of any combination of these, a corresponding metal oxide, or any combination thereof. The evaporable getter material may comprise a porous material.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

FIG. 1A provides a cross sectional view of an embodiment of the optical cavity 10 for stabilization of a laser. The optical cavity includes a first mirror 12, a second mirror 14, a spacer 16, and a vent hole 18. The first mirror 12 and the second mirror 14 are configured in substantially parallel planes to one another and separated by the spacer 16. The spacer 16 geometry defines the optical path length of the cavity and resulting spectral characteristics of the optical cavity 10 for feedback control of the frequency of a laser locked to the optical cavity's 10 length. Any spacer 16 geometry (e.g., cylindrical, cubical, etc.) or spacer material may be used, for example, spacers comprising low thermal expansion materials. In addition, any conventional mirrors and mirror assemblies (12, 14) may be used, such as mirrors comprising one or more optical coating or thin film. For certain applications, the optical cavity 10 preferably comprises an ultra-stable optical resonance cavity for ultra-stable laser applications. For example, in a preferred embodiment of the invention, the optical cavity 10 comprises a high finesse Fabry-Perot cavity, a so-called vacuum gap cavity.

Figure 1B:
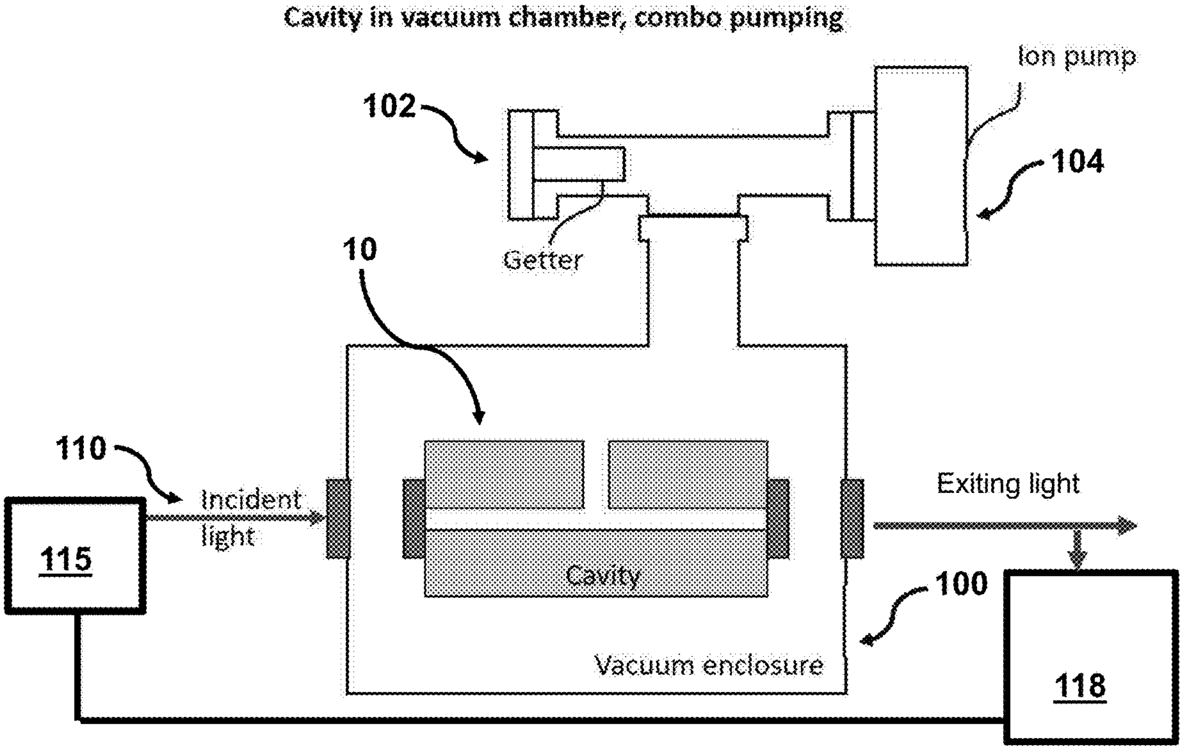
FIG. 1B: Diagram of an exemplary ultra-stable optical resonance cavity housed in a vacuum chamber housing according to certain embodiments employing combination pumping with a getter pump, such as a NEG pump, and an ion pump.

Referring now to FIG. 1B, a cross sectional view of an embodiment of the optical cavity 10 enclosed in a vacuum chamber housing is shown. As shown in FIG. 1B, the vacuum enclosure 100 is connected to a dual vacuum pump system comprising a getter pump 102 and an ion pump 104. The dual pump system may be operated whereby the ion pump 104 is connected to a power source and is switched on for a period of time to maintain and control the pressure in the vacuum enclosure 100, for example to provide a low pressure, e.g., below $1\times10^{-6}$ Torr. In addition, the ion pump 104 may be switched off and the pressure inside the vacuum enclosure 100 that houses ultra-stable optical cavity 10 may be maintained and controlled substantially (e.g. within 10%) at or below $1\times10^{-6}$ Torr by the getter pump 102, pumping alone. In the embodiment shown in FIG. 1B, the getter pump 102 does not require a power source to pump. Therefore, the vacuum pressure within the vacuum enclosure 100 housing the optical cavity 10 may be maintained during periods where access to a power source for operation of the ion pump 104 is unavailable or inconvenient.

For some applications, it is preferable to maintain the pressure in the optical cavity 10 housed in a vacuum enclosure 100 at less than $1\times10^{-6}$ Torr, optionally less than $1\times10^{-7}$ Torr, for example, to achieve $1\times10^{-15}$ or better fractional length stabilities. In some embodiments, incident light 110 is provided by laser source 115 and enters at the left of the optical cavity 10. In some embodiments, the fractional length stability of the optical cavity is used to stabilize the frequency of the laser source 115, for example, via feedback control element 118 in operable communication with laser source 115.

It is preferable for some applications to maintain the vacuum pressure in the vacuum enclosure 100 housing the optical cavity 10 without access to power, such as in a remote location. For example, access to power may not exist during long haul shipping of an ultra-stable laser system or during launch into space, where ultra-stable laser systems are employed in various high precision laser applications. Pressure fluctuations are not preferable in the optical cavity 10 stability due to the resulting refractive index instability and ultimately fractional frequency instability. The present invention makes ultra-stable laser assemblies tolerant to power dropouts under which the ion pump 104 cannot not operate via maintenance of the vacuum pressure through passive pumping accomplished with the getter pump 102. Should power be lost or not available, the present invention provides a system in which the pressure may be maintained passively at pressures substantially below $1\times10^{-6}$ Torr such that the ion pump 104 may be restarted without the need for supplemental pumping. The present methods, therefore, enable fully passive pumping for pressure control and maintenance in ultra-stable laser systems.

The dual vacuum pump embodiment of the present invention provides significant advantages over the prior art use of an ion pump only system. First, the length of time that the ion pump 104 can be shut off and restarted may be significantly increased and in some cases very long periods (tens of days to months). This permits unpowered transportation of the cavity stabilized system to remote locations. It also permits the user to keep the system unpowered for long periods of time and the vacuum level can be easily recovered without the need for supplemental pumps which may be unavailable in environments outside of a highly equipped laboratory.

Additionally, the lifetime of the accompanying ion pump 104 may be increased, as the load on the ion pump is reduced by accommodation of gases by the getter pump. Increasing ion pump performance provides overall enhancement of the operational lifetime of the optical system.

Figure 1C:
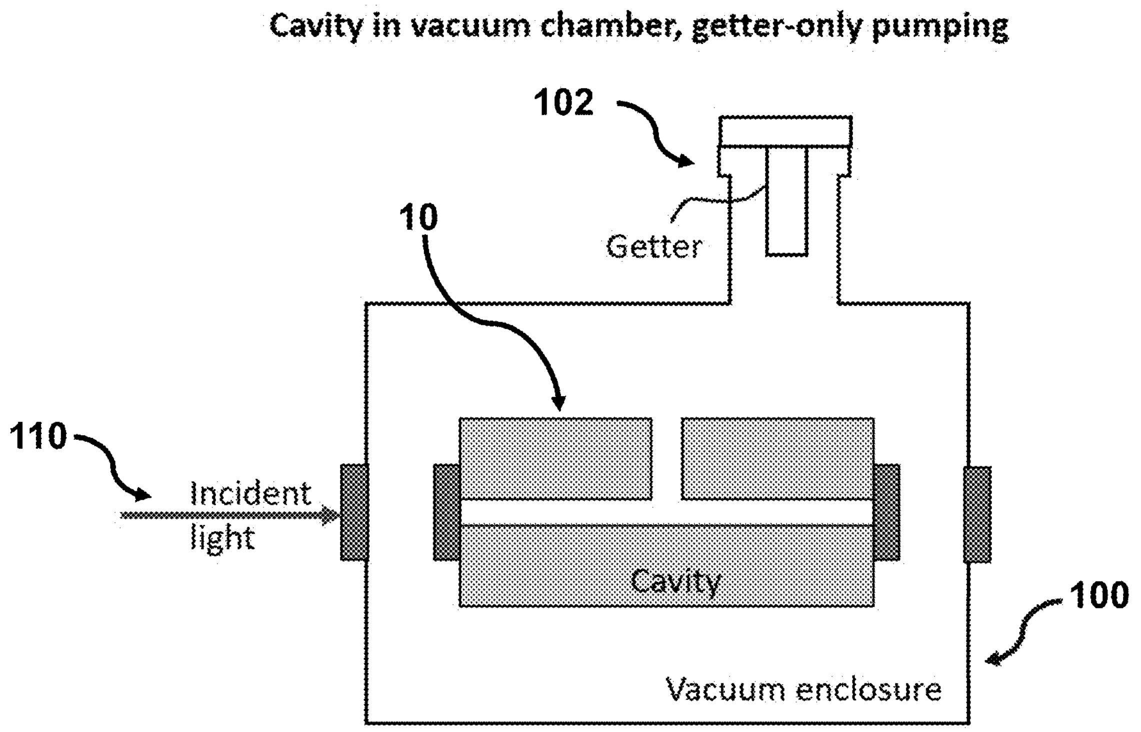
FIG. 1C: Diagram of an exemplary ultra-stable optical resonance cavity housed in a vacuum chamber housing according to certain embodiments employing a getter pump, such as pumping only with an NEG pump or evaporable getter pump.

Referring now to FIG. 1C, a cross sectional view of an embodiment of the optical cavity 10 enclosed in a vacuum chamber housing is shown. In this embodiment of the present invention, the vacuum enclosure 100 shown is connected to a vacuum pump comprised only of a getter pump, such as non-evaporable getter (NEG) pump 102 for passive, power-free pumping for pressure control and maintenance in an ultra-stable laser system. Advantages of this NEG pump 102 only embodiment include size, weight, power, and cost (SWaP-C) savings from not using an ion pump or ion pump controller and fully passive pumping. For example, SWaP-C savings are generated by the reduction in weight of an ultra-stable laser system using a getter only pump system because getter pumps are significantly small compared to ion pumps. Additionally, SWaP-C savings may be generated, for example, by decreasing the power necessary to maintain and control the pressure in a vacuum housing an ultra-stable laser system. For example, this embodiment of the invention may impart the aforementioned advantages on the use of optical cavity 10 stabilized ultra-stable laser systems further enabling the use of ultra-stable laser systems in remote or field applications such as in low-earth orbit applications including, but not limited to, improved optical clocks, navigation, and fundamental physics experiments.

The invention can be further understood by the following non-limiting examples.

Example 1: Vacuum Recovery and Optical Characterization During Periods of Passive Pumping Only This example provides experimental results demonstrating pressure stability achieved by incorporation of both an ion pump and a NEG pump to control and maintain the pressure of an ultra-stable optical resonance cavity housed in vacuum housing.

Figure 2:
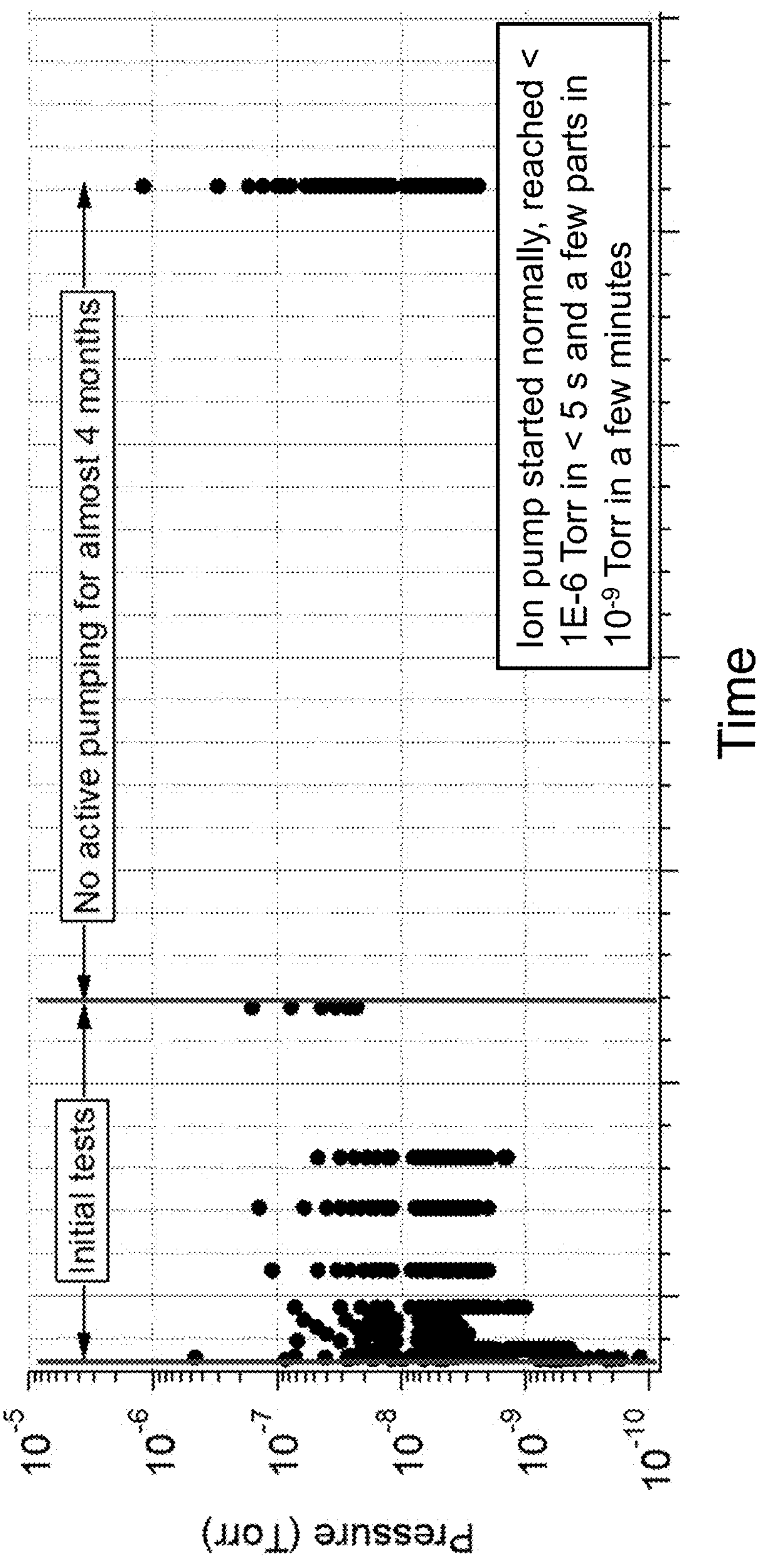
FIG. 2: Data showing the pressure (Torr) within a vacuum housing of an exemplary method and system as a function of time for controlling and maintaining the pressure in an ultra-stable optical resonance cavity wherein the pumping system comprises an NEG pump and an ion pump. Initial tests: in the initial tests the ion pump was turned on for two minutes every hour for approximately ten days. When those tests continued to reach very low pressures, the ion pump was turned on for two minutes once every day and then for five minutes once every week for approximately six weeks. When those tests continued to reach very low pressures, the ion pump was kept off for approximately four months. The ion pump was able to restart normally after remaining off for approximately four months. These vacuum recovery data indicate that sufficient vacuum can be recovered after several months using only passive pumping via a getter pump and without active pumping.

The pressure (Torr) inside of a vacuum chamber 100 housing the optical cavity 10, wherein the pumping system was a combination pump system comprising both the NEG pump 102 and the ion pump 104, of the present invention, was measured over a period of approximately six months. The pressure measurements are shown in FIG. 2. During initial tests, the ion pump 104 was turned on for two minutes every hour. When the pressure in the vacuum chamber 100 continued to reach very low pressures, for example, $1\times10^{-6}$ Torr, $1\times10^{-7}$ Torr, $1\times10^{-8}$ Torr, $1\times10^{-9}$ Torr, or $1\times10^{-10}$ Torr, over several days, the ion pump 104 was then turned on for five minutes once a week. Again, very low pressures in the range from $1\times10^{-6}$ to $1\times10^{-10}$ Torr in the vacuum chamber 100 were achieved and the ion pump 104 was able to be restarted without the need for supplemental pumping due to the presence of the NEG pump 102, which provided passive pumping while the ion pump 104 was turned off. After these weekly tests were performed for a period of approximately six weeks, the ion pump 104 was turned off for four months. After four months, wherein the pressure was maintained within the vacuum chamber by passive only pumping, the ion pump 104 was turned on. Significantly, after four months of passive pumping only with the NEG pump 102, the ion pump 104 was able to begin pumping without the need for supplemental pumping and a low pressure of $1\times10^{-6}$ Torr was achieved in less than five seconds and a few parts in $10^{-9}$ Torr in a few minutes. This example demonstrates that vacuum pressures may be recovered with an ion pump after long periods of passive only pumping, for example up to at least four months in a vacuum chamber housing an optical cavity for use in ultra-stable laser applications.

Example 2A: Comparison of Frequency Stability During Passive and Combination Pumping This example provides experimental results demonstrating frequency stability achieved by incorporation of both an ion pump and a NEG pump to control and maintain the pressure of an ultra-stable optical resonance cavity housed in vacuum housing which is deployed to a remote setting.

Figure 3:
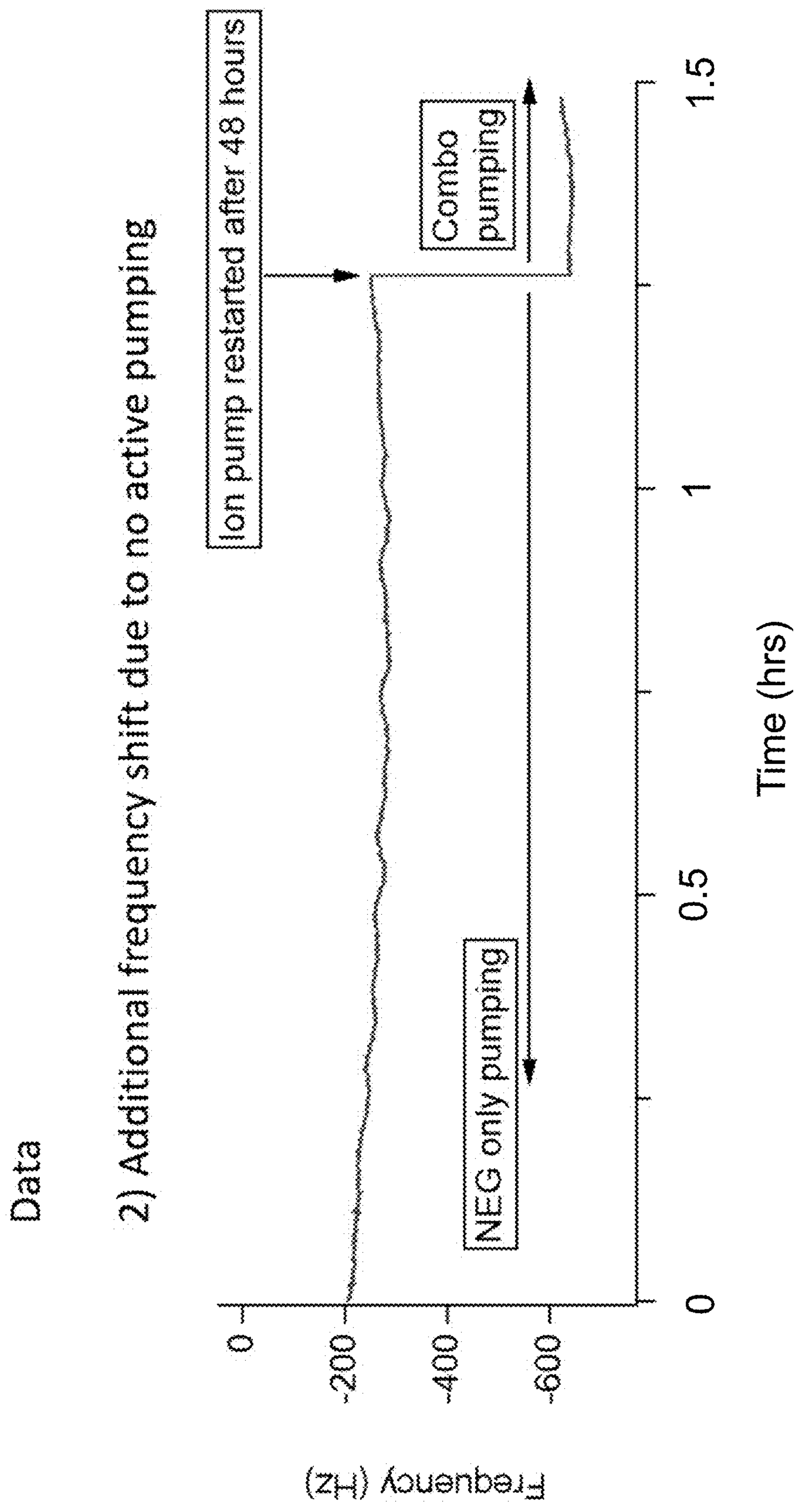
FIG. 3: Plot showing frequency of an ultra-stable laser locked to an ultra-stable optical resonance cavity housed in a vacuum chamber housing according to certain exemplary embodiments employing combination pumping with a NEG pump and an ion pump during passive pumping only (NEG only pumping) and during active pumping (combo pumping). Active pumping was restarted after 48 hours of only passive pumping by turning on the ion pump.

In this example, a fiber laser was locked to an ultra-stable optical resonance cavity, for example, a high Finesse Fabry-Perot cavity, using standard Pound-Drever-Hall (PDH) locking. In this example, the optical source frequency lock used a reference cavity housed in a vacuum chamber equipped with combination pumping comprising a NEG pump and an ion pump. The frequency of an optical source locked to a pressure controlled reference cavity during passive pumping only (NEG pumping only) and during active pumping (combination pumping) is shown in FIG. 3. Active pumping was restarted after 48 hours of passive pumping only by turning on the ion pump. The frequency shift during passive pumping only with a NEG was less than 400 Hz over 48 hours. In a standard ultra-low expansion (ULE) glass cavity, this is a low amount of drift which is likely not observable over the normal drift. Additionally, this level of frequency shift during passive pumping only indicates that the pressure rose in the order of a few parts in $10^{-6}$ Torr over 48 hours. When the ion pump was switched on after 48 hours of passive pumping only, the frequency shifted by about 400 Hz due to a sudden drop in pressure as a result of the additional pumping. The frequency stability was analyzed by calculating the Allan deviation for data taken from the time series prior to restarting the ion pump and then from data taken from the time series after the ion pump was restarted. The laser frequency data provided in FIG. 3 was collected from an embodiment of the present invention deployed in a harsh environment outside of a laboratory setting. Therefore, the light corresponding to the frequency data required transport to a lab through an unstabilized optical fiber link. Therefore, for example, vibrations associated with the unstabilized optical fiber link may degrade the fractional frequency stability at 1 second.

Figure 4:
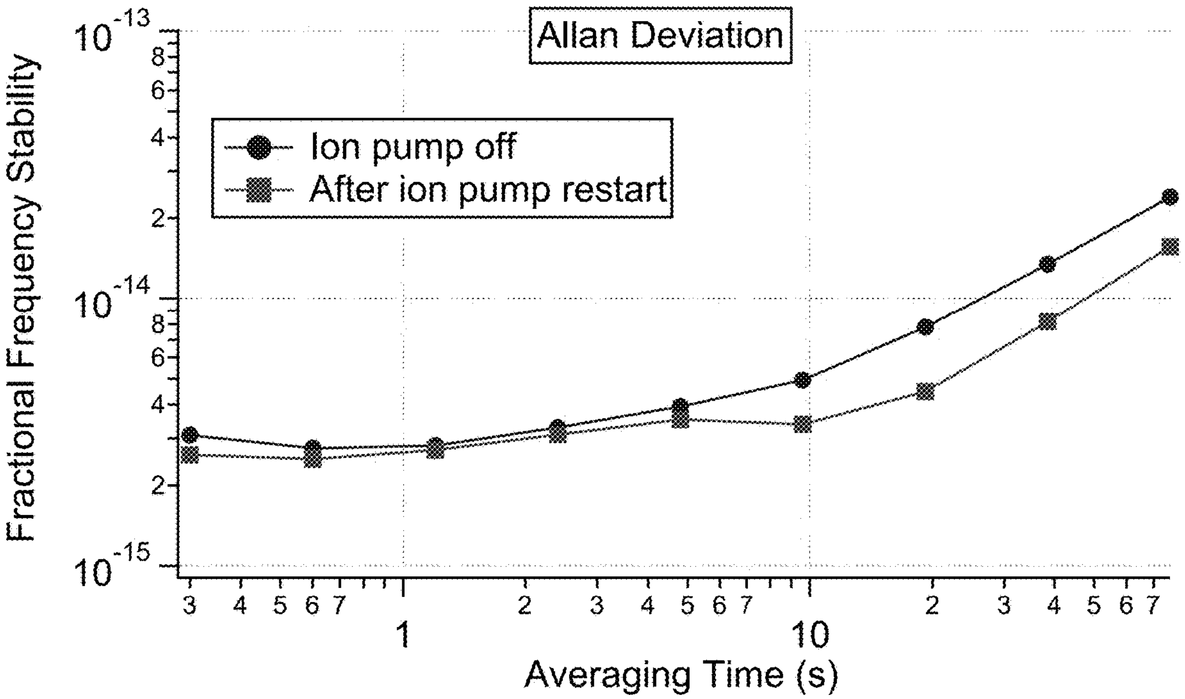
FIG. 4: Allan deviation plot showing the fractional frequency stability as a function of averaging time. The frequency stability was analyzed for the time interval corresponding to the frequency stability during passive pumping only using a getter pump (blue circles) and for the time interval corresponding to the frequency stability during combination pumping using an ion pump with a getter pump (red squares).

Example 2B: Comparison of Frequency Stability During Passive and Combination Pumping The above experiment was repeated in a controlled laboratory setting. The fractional frequency stabilities during passive pumping only using a getter pump (blue circles) and combination pumping using an ion pump with a getter pump (red squares) are shown in FIG. 4. As shown in this figure, there is not a significant degradation of the frequency stability of the laser locked to an ultra-stable optical resonance cavity housed in a vacuum housing during passive pumping using a getter pump only as opposed to combination pumping using an ion pump with a getter pump. Notably, the fractional frequency stability achieved using a getter pump (alone or in combination with an ion pump) is less than $3\times10^{-15}$ at an averaging time of 1 s.

Example 3: Characterization of Pressure Stability During Passive Pumping Only

This example provides experimental results demonstrating pressure stability during passive pumping only in an embodiment of the present invention wherein the pressure of an ultra-stable optical resonance cavity housed in a vacuum housing was controlled and maintained for time periods with passive pumping only or time periods during which combination pumping with an NEG pump and an ion pump was employed.

Figure 5:
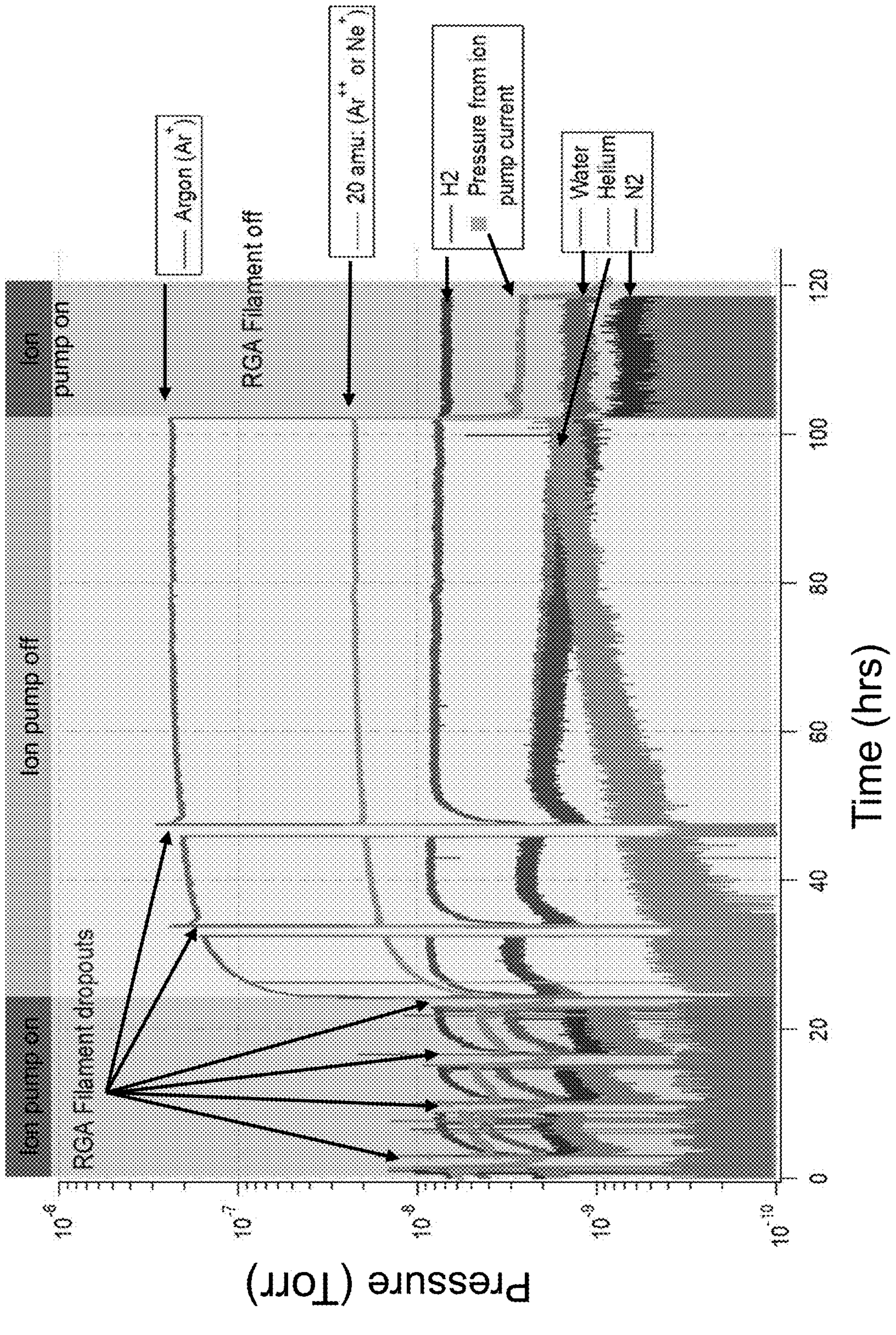
FIG. 5: Data showing partial pressure of gases (Torr) present within a vacuum housing of an exemplary method and system of the present invention as a function of time for controlling and maintaining the pressure in an ultra-stable optical resonance cavity wherein the pumping system comprises an NEG pump and an ion pump. The partial pressure of the following gases present in the vacuum housing were measured using a residual gas analyzer (RGA): Ar (magenta and grey line), $H_2$ (red line), water (green line), He (brown line), and $N_2$ (blue line). The ion pump was continuously on for the first 24 hours of the partial pressure measurements. Subsequently, at about 24 hours, the ion pump was turned off and the vacuum was pumped using a NEG pump only for approximately 80 hours. After the approximately 80 hours of passive only pumping, the ion pump was restarted.

In this example, the partial pressure of gases present in an ultra-stable optical resonance cavity housed in a vacuum housing were measured using a residual gas analyzer (RGA). The embodiment of the present invention deployed in this experiment was equipped with combination pumping comprising an ion pump and a NEG pump to control and maintain the pressure within the vacuum housing. For the first 24 hours of partial pressure measurements, the pressure was maintained with combination pumping. At approximately 24 hours, the ion pump was turned off for approximately 80 hours. During the time that the ion pump was turned off, pumping was carried out with a NEG pump only (passive pumping only). After about 80 hours of passive pumping only, at approximately 105 total elapsed hours, the ion pump was turned on until the experiment was stopped at approximately 120 hours. The partial pressure of gases present in the vacuum chamber during the approximately 120 hours of the experiment were measured continuously with a RGA as shown in FIG. 5. The data dropouts labeled "RGA filament dropout" are due to an intermittent malfunction of the RGA filament. Initially, when the pressure within the vacuum housing of the embodiment of the present invention was maintained and controlled with combination pumping, the highest measured partial pressure of a gas was $H_2$ at approximately $9\times10^{-9}$ Torr (red line). After the ion pump was turned off at approximately 24 hours, and the system was pumped using a NEG pump only, the residual gas was dominated by Ar (magenta line), a noble (inactive) gas, with the partial pressure of Ar rising to approximately $2\times10^{-7}$ Torr. In addition, the partial pressure of He (brown line), a noble (inactive) gas increased during NEG pumping only. The partial pressures of the active gases—$N_2$ (blue line), $H_2O$ (green line), and $H_2$ (red line)—were well controlled during the passive pumping only period (NEG pumping) as observed in FIG. 5. The partial pressure of active gases in an embodiment of the present invention may vary slightly during combination pumping and passive pumping, for example, as a function of the properties of the getter pump and the relative abilities of the ion pump and the getter pump to pump a gaseous species existing in a vacuum housing. The overall pressure of the constituent gases during passive pumping only remained below $1\times10^{-6}$ Torr and the ion pump was able to be restarted at approximately 105 hours, after approximately 80 hours of passive pumping only, without the need for supplemental pumping. These data indicate that the pressure of an ultra-stable optical resonance cavity, for example a Fabry-Perot cavity, housed in a vacuum housing for ultra-stable laser applications may be maintained and controlled for long periods of time, for example, up to at least 80 hours, under passive pumping only conditions using a NEG.

Example 4: The Use of NEG Pumps in Ultra-Stable Laser Systems and the Corresponding Effect on Optical Cavity Finesse This example provides experimental data corresponding to the use of a NEG pump, and the corresponding NEG pump material, on the finesse of an ultra-stable optical cavity housed in a vacuum housing equipped with a NEG pump that is a NEXTorr® Z100 from Saes Group.

Figure 6:
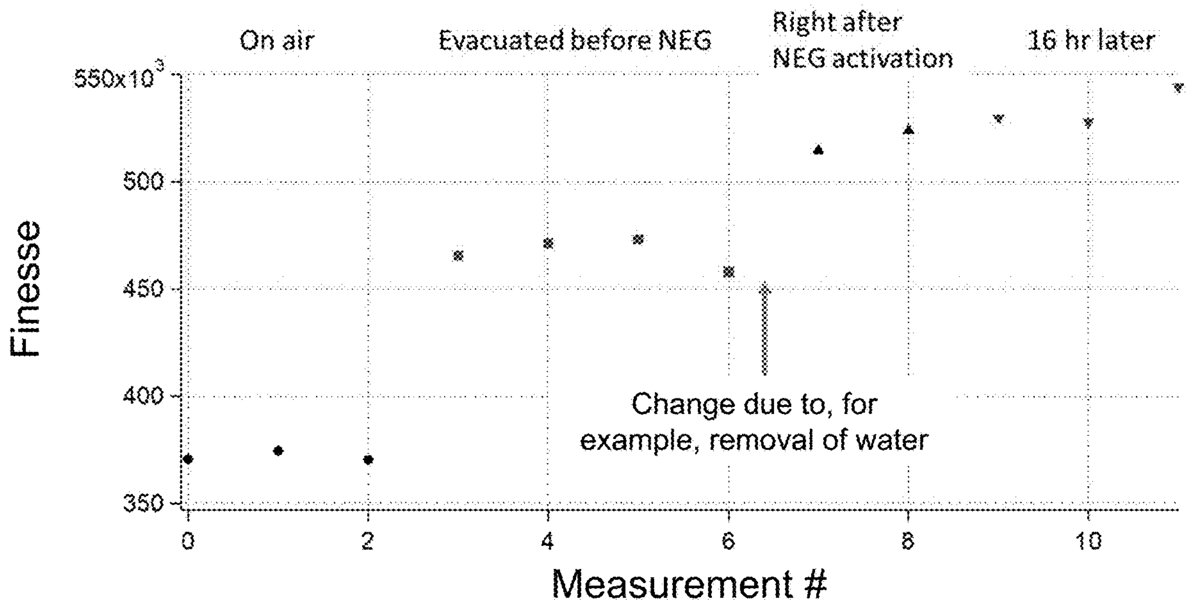
FIG. 6: Data showing the Finesse of an ultra-stable optical cavity housed in a vacuum housing equipped with an ion pump and a NEG pump for combination pumping. The Finesse of the optical cavity was measured under the following conditions: (1) at atmospheric pressure (on air; black dots); (2) after evacuation of the vacuum housing with an ion pump (evacuated before NEG; red squares); (3) immediately following NEG pump activation (right after NEG activation; black triangles); and (4) 16 hours after NEG activation (purple inverted triangles).

The present invention, as disclosed herein, is the use of passive pumping with getter pumps, either alone or in combination with other active pumping mechanisms, for example, ion pumps, for controlling and maintaining the pressure of an ultra-stable optical resonance cavity for ultra-stable laser applications. One consideration in such systems and methods of the present invention employing a getter pump for passive pumping is the possible effect of material that may be released during getter pump activation, for example, NEG pump activation or evaporable getter pump activation. During activation of the getter pump material, for example, activation via application of heat, material may be released from the bulk getter material and result in possible contamination of the low-loss coatings of a high Finesse, ultra-stable optical resonance cavity that is housed in the vacuum housing. Therefore, to understand the extent of contamination of low-loss coatings of an ultra-stable optical resonance cavity, for example, a Fabry-Perot cavity, of the present invention, the Finesse of an ultra-stable optical resonance cavity housed in a vacuum equipped with combination pumping was measured as shown in FIG. 6 in air (black dots), after evacuation using an ion pump (red squares), immediately following activation of a NEG pump (black triangles), and approximately 16 hours after NEG pump activation (purple inverted triangles). The measurement numbers in FIG. 6 correspond to increasing time. The data in FIG. 6 indicates that the Finesse of the cavity increases slightly after both evacuation of the vacuum chamber with an ion pump, for example, due to the removal of adsorbed water molecules from the low-loss coatings of the ultra-stable optical cavity, and after activation of the NEG pump, for example, and may potentially be due to contamination of the low-loss coatings of the ultra-stable optical resonance cavity via material released from the NEG pump during activation.

REFERENCES

[1] N. O. Zhadnov, K. S. Kudeyarov, D. S. Kryuchkov, G. A. Vishnyakova, K. Yu Khabarova, and N. N. Kolachevsky. "48-cm-long room-temperature cavities in vertical and horizontal orientations for Sr optical clock." Applied Optics 60, no. 29 (2021): 9151-9159.

[2] Rodolphe Boudot, James P. McGilligan, Kaitlin R. Moore, Vincent Maurice, Gabriela D. Martinez, Azure Hansen, Emeric de Clercq, and John Kitching. "Enhanced observation time of magneto-optical traps using micro-machined non-evaporable getter pumps." Scientific Reports 10, no. 1 (2020): 1-8.

[3] Benvenuti, C., P. Chiggiato, F. Cicoira, and Y. L'Aminot. "Nonevaporable getter films for ultrahigh vacuum applications." Journal of Vacuum Science & Technology A: Vacuum, Surfaces, and Films 16, no. 1 (1998): 148-154.

[4] Benvenuti, Cristoforo, P. Chiggiato, P. Costa Pinto, A. Escudeiro Santana, T. Hedley, A. Mongelluzzo, V. Ruzinov, and I. Wavers. "Vacuum properties of TiZrV non-evaporable getter films." Vacuum 60, no. 1-2 (2001): 57-65.

[5] Dreyer, R. W. P.; Hall, J. L.; Kowalski, F. V.; Hough, J.; Ford, G. M.; Munley, A. J.; Ward, H. (June 1983). "Laser phase and frequency stabilization using an optical resonator" (PDF). Applied Physics B. 31 (2): 97-105.

[6] Black, Eric D. "An introduction to Pound-Drever-Hall laser frequency stabilization" (PDF). Am J Phys. 69 (2001) (1): 79-87.

[7] Young, B. C., F. C. Cruz, W. M. Itano, and J. C. Bergquist. "Visible lasers with subhertz linewidths." Physical Review Letters 82, no. 19 (1999): 3799.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

Every device, system, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An optical system comprising:

a first reflector;

a second reflector in optical communication with the first reflector;

a spacer having a first end and a second end provided between the first reflector and the second reflector; wherein the first reflector is positioned at the first end of the spacer and the second reflector is positioned at the second end of the spacer to provide an optical path length between the first reflector and the second reflector; wherein the first reflector and the second reflector are positioned such that the first reflector and the second reflector intersect an incident light beam, thereby forming an optical resonance cavity between the first reflector and the second reflector;

a vacuum housing enclosing the optical resonance cavity;

a pumping system in communication with the vacuum housing for maintaining a pressure in the vacuum housing less than $1\times10^{-6}$ Torr; the pumping system comprising a getter pump; the getter pump being configured to maintain the pressure inside the vacuum housing at or below $1\times10^{-6}$ Torr after evacuation; and wherein the optical resonance cavity is a Fabry-Perot cavity, an ultra-stable cavity, or a vacuum gap cavity.

2. The optical system of claim 1, wherein said getter pump comprises an evaporable getter pump.

3. The optical system of claim 1, wherein said getter pump comprises a non-evaporable getter (NEG) pump.

4. The optical system of claim 1, wherein the pumping system further comprises an ion pump.

5. The optical system of claim 1, wherein the pumping system does not comprise an ion pump.

6. The optical system of claim 1, wherein said optical resonance cavity is a space-vented cavity in low-earth orbit.

7. The optical system of claim 1, wherein the pumping system provides a constant pressure of the optical resonance cavity.

8. The optical system of claim 7, wherein the constant pressure of the optical resonance cavity is characterized by variations of less than $3\times10^{-9}$ Torr in 1 s.

9. The optical system of claim 1, wherein the getter pump is characterized by a pumping speed selected over the range of 1 l/s to 500 l/s.

10. The optical system of claim 1, wherein the getter pump is characterized by a sorption capacity selected over the range of 0.005 Torr·l to 1,000 Torr·l.

11. The optical system of claim 1, wherein the getter pump is provided within the vacuum housing.

12. The optical system of claim 11, wherein said getter pump comprises a non-evaporable getter (NEG) pump; and wherein the NEG pump is provided as a coating on a portion of an internal surface of the vacuum housing exposed to the optical resonance cavity.

13. The optical system of claim 12, wherein the NEG pump comprises one or more porous metals, alloys, or metal oxides.

14. The optical system of claim 12, wherein the NEG pump comprises Al, Zr, Ti, V, or Fe.

15. The optical system of claim 11, wherein said getter pump comprises an evaporable getter pump.

16. The optical system of claim 15, wherein the evaporable getter pump comprises one or more of metals, alloys, and metal oxides.

17. The optical system of claim 15, wherein the evaporable getter pump comprises $Ba(N_3)_2$, Ta, Nb, Zr, Th, Ti, Al, Mg, Ba, or P.

18. The optical system of claim 1, wherein the getter pump is configured to maintain the pressure in the vacuum housing at or below $1\times10^{-6}$ Torr for a duration of at least 80 hours.

19. A method of controlling pressure in an ultra-stable optical resonance cavity, the method comprising:

providing the ultra-stable cavity enclosed in a vacuum housing; wherein the ultra-stable cavity comprises:

a first reflector;

a second reflector in optical communication with the first reflector;

a spacer having a first end and a second end provided between the first reflector and the second reflector; wherein the first reflector is positioned at the first end of the spacer and the second reflector is positioned at the second end of the spacer to provide an optical path length between the first reflector and the second reflector;

wherein the first reflector and the second reflector are positioned such that the first reflector and the second reflector intersect an incident light beam, thereby forming the ultra-stable optical resonance cavity between the first reflector and the second reflector;

maintaining a pressure in the vacuum housing less than $1\times10^{-6}$ Torr using a pumping system in communication with the vacuum housing; wherein the pumping system comprises a getter pump, the getter pump maintaining the pressure inside the vacuum housing at or below $1\times10^{-6}$ Torr after evacuation; and wherein the optical resonance cavity is a Fabry-Perot cavity, an ultra-stable cavity, or a vacuum gap cavity.

20. The method of claim 19, wherein said getter pump comprises an evaporable getter pump.

21. The method of claim 19, wherein said getter pump comprises a non-evaporable (NEG) getter pump.

22. A method of transporting an ultra-stable optical resonance cavity, the method comprising:

providing the ultra-stable cavity enclosed in a vacuum housing; wherein the ultra-stable cavity comprises:

a first reflector;

a second reflector in optical communication with the first reflector;

a spacer having a first end and a second end provided between the first reflector and the second reflector; wherein the first reflector is positioned at the first end of the spacer and the second reflector is positioned at the second end of the spacer to provide an optical path length between the first reflector and the second reflector;

wherein the first reflector and the second reflector are positioned such that the first reflector and the second reflector intersect an incident light beam, thereby forming the ultra-stable optical resonance cavity between the first reflector and the second reflector;

pumping said vacuum enclosure during transport using a pumping system in fluid communication with the vacuum housing so as to maintain a pressure in the vacuum housing less than $1\times10^{-6}$ Torr; wherein the pumping system comprises a getter pump, the getter pump maintaining the pressure inside the vacuum housing at or below $1\times10^{-6}$ Torr after evacuation; and wherein the optical resonance cavity is a Fabry-Perot cavity, an ultra-stable cavity, or a vacuum gap cavity.

23. The method of claim 22, wherein said getter pump comprises an evaporable getter pump.

24. The method of claim 22, wherein said getter pump comprises a non-evaporable getter pump.

* * * * *